(12) United States Patent
Cassioppi et al.

(10) Patent No.: US 11,564,085 B2
(45) Date of Patent: Jan. 24, 2023

(54) METHODS, SYSTEMS, AND DEVICES FOR MASKING CONTENT TO OBFUSCATE AN IDENTITY OF A USER OF A MOBILE DEVICE

(71) Applicants: AT&T Intellectual Property I, L.P., Atlanta, GA (US); AT&T Mobility II LLC, Atlanta, GA (US)

(72) Inventors: Nicholas Cassioppi, Austin, TX (US); Eric Zavesky, Austin, TX (US); James H. Pratt, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 20 days.

(21) Appl. No.: 17/168,804

(22) Filed: Feb. 5, 2021

(65) Prior Publication Data
US 2022/0256332 A1 Aug. 11, 2022

(51) Int. Cl.
| | | |
|---|---|---|
| *H04W 12/02* | (2009.01) | |
| *H04W 12/03* | (2021.01) | |
| *H04W 4/12* | (2009.01) | |
| *H04M 3/42* | (2006.01) | |
| H04W 4/90 | (2018.01) | |

(52) U.S. Cl.
CPC ....... *H04W 12/02* (2013.01); *H04M 3/42059* (2013.01); *H04W 4/12* (2013.01); *H04W 12/03* (2021.01); *H04W 4/90* (2018.02)

(58) Field of Classification Search
CPC ..... H04W 12/00; H04W 12/02; H04W 12/03; H04W 12/04; H04W 12/06; H04W 12/062; H04W 12/30; H04W 4/12; H04W 4/24; H04W 4/90; H04M 3/42059; H04M 3/42068; H04M 3/42085
See application file for complete search history.

(56) References Cited

U.S. PATENT DOCUMENTS

| | | | | |
|---|---|---|---|---|
| 9,154,303 | B1 * | 10/2015 | Saylor ..................... | H04L 9/321 |
| 10,122,825 | B1 * | 11/2018 | Petty ..................... | G06V 40/173 |
| 2004/0139010 | A1 * | 7/2004 | McMichael .......... | G06Q 20/102 |
| | | | | 705/40 |
| 2016/0343037 | A1 * | 11/2016 | Nicholas ................. | H04L 67/02 |
| 2019/0342721 | A1 * | 11/2019 | Thomas ................ | H04W 4/024 |
| 2021/0042505 | A1 * | 2/2021 | Dintakurty ............. | G16H 40/67 |
| 2021/0160340 | A1 * | 5/2021 | Narayanan .......... | H04W 12/106 |

* cited by examiner

*Primary Examiner* — Jean A Gelin
(74) *Attorney, Agent, or Firm* — Guntin & Gust, PLC; Ralph Trementozzi

(57) ABSTRACT

Aspects of the subject disclosure may include, for example, identifying a first user associated with a first mobile device, and determining a first user type associated with the first user. Further embodiments can include identifying a first identity associated with the first user based on the first user type and identifying a second identity associated with the first user based on the first user type. Additional embodiments can include providing first alternate content to the first mobile device to mask the first identity and providing second alternate content to the first mobile device associated with the second identity. Other embodiments are disclosed.

20 Claims, 17 Drawing Sheets

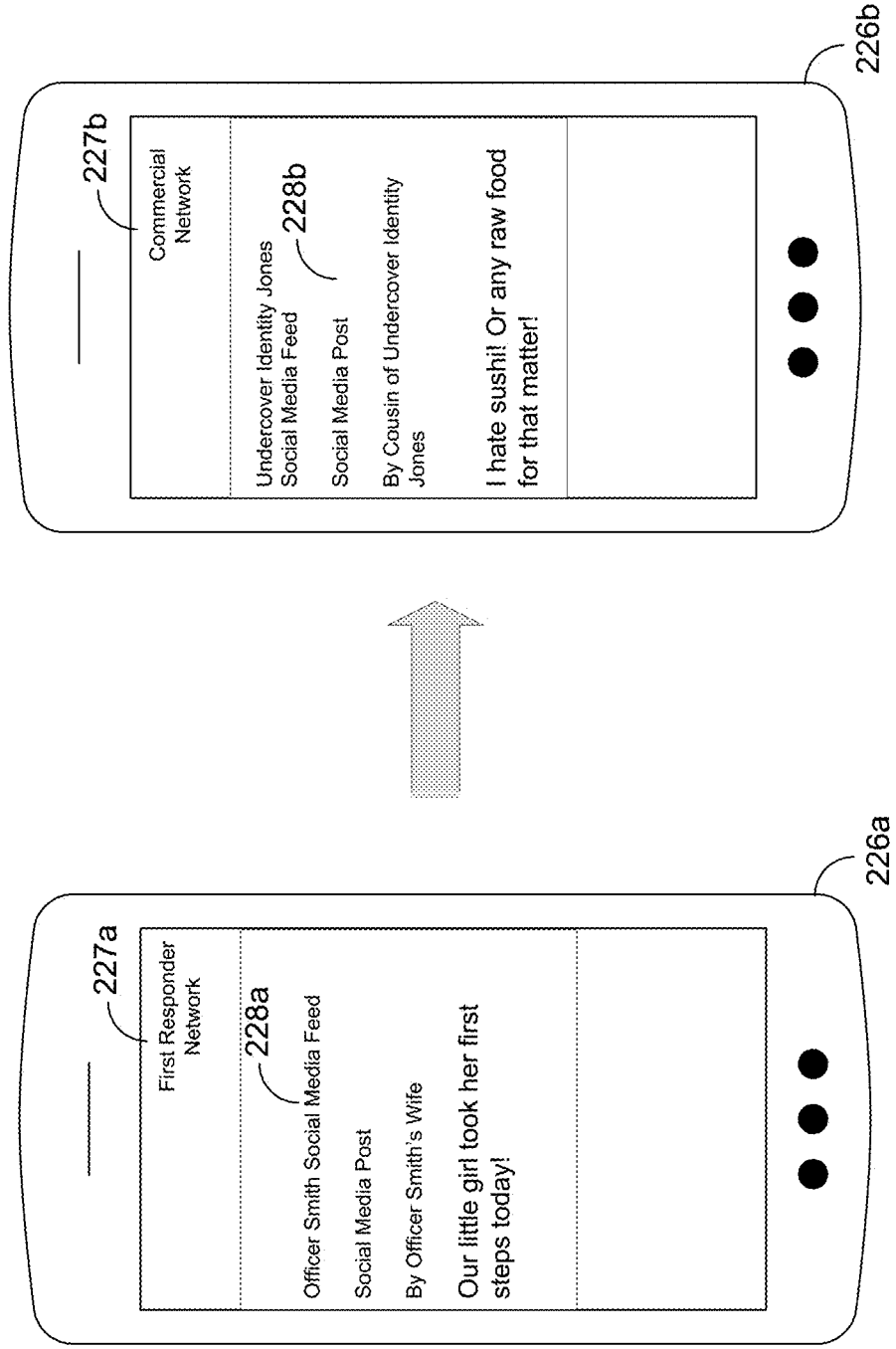

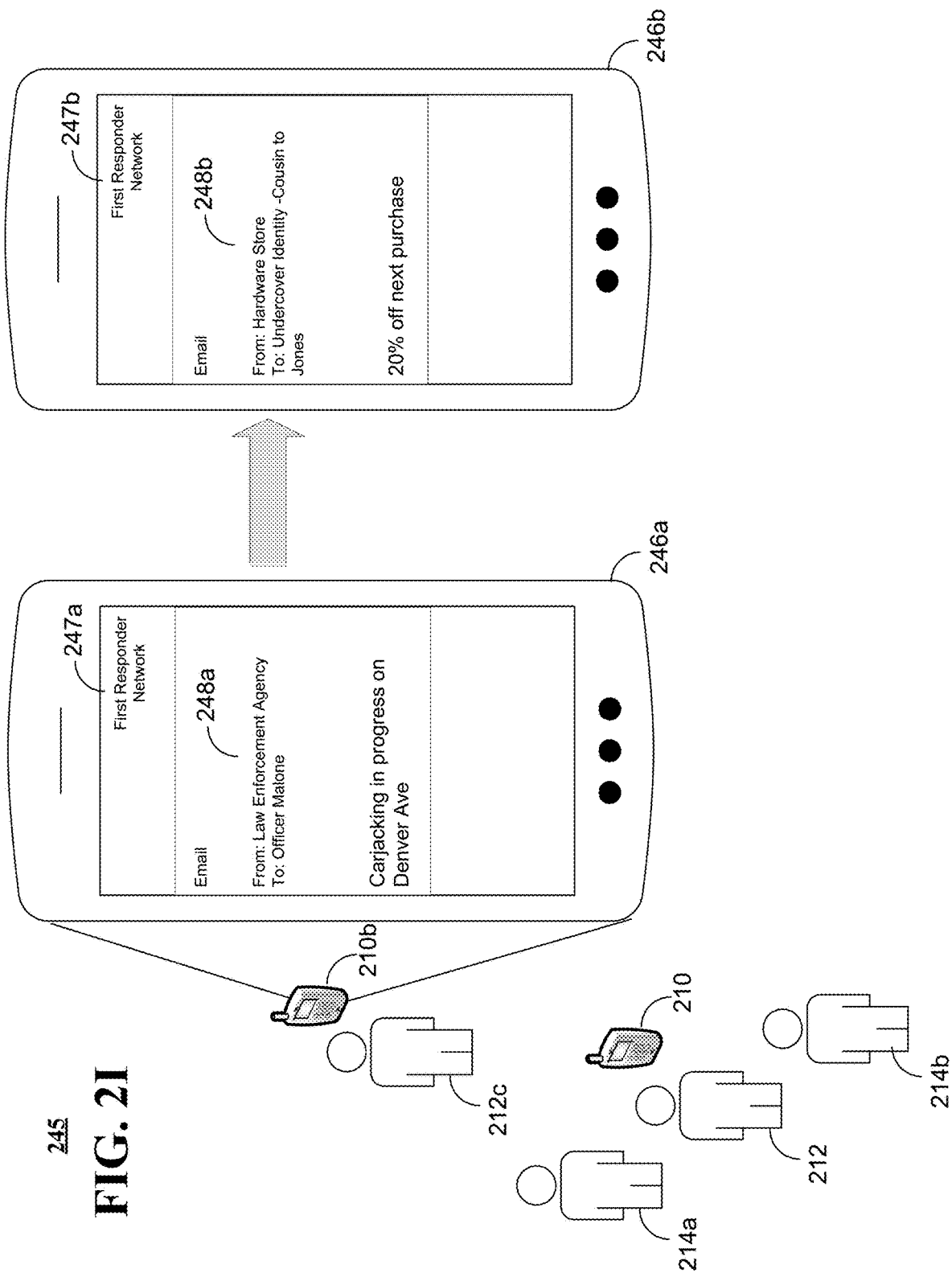

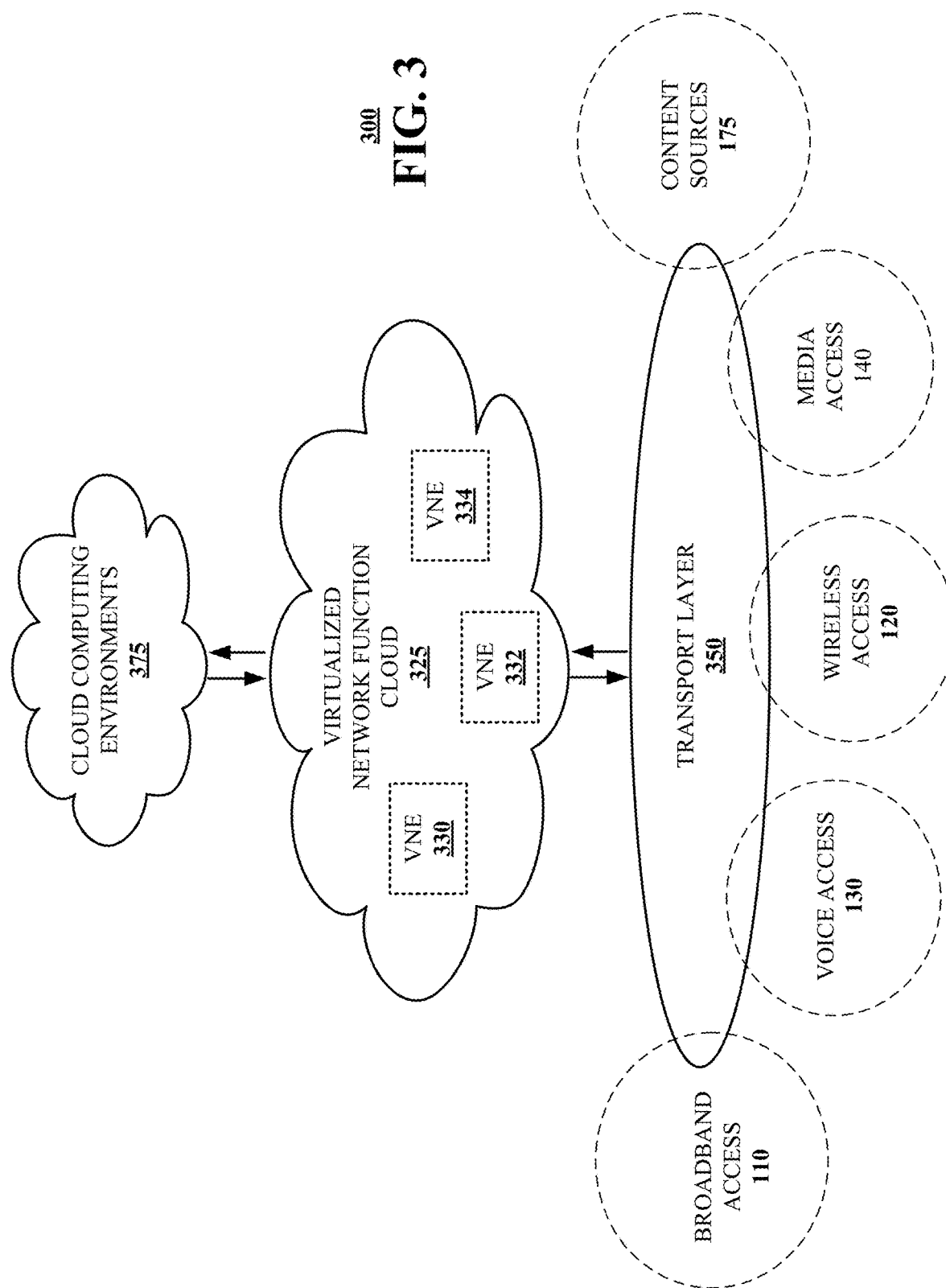

METHODS, SYSTEMS, AND DEVICES FOR MASKING CONTENT TO OBFUSCATE AN IDENTITY OF A USER OF A MOBILE DEVICE

FIELD OF THE DISCLOSURE

The subject disclosure relates to methods, system, and devices for masking content to obfuscate an identity of a user of a mobile device.

BACKGROUND

First responders including law enforcement personnel can utilize a first responder mobile network to communicate with each other. The advantages of first responders utilizing a first responder mobile network are that communication between first responders can be prioritized due to urgency or emergency, accordingly. However, a mobile device that is communicatively coupled to the first responder mobile network can contain content that reveals that it is on the first responder mobile network. If so, such a revelation can put personnel in jeopardy if the mobile device is inspected by a bad actor.

BRIEF DESCRIPTION OF THE DRAWINGS

Reference will now be made to the accompanying drawings, which are not necessarily drawn to scale, and wherein:

FIGS. 2A-2I are block diagrams illustrating example, non-limiting embodiments of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
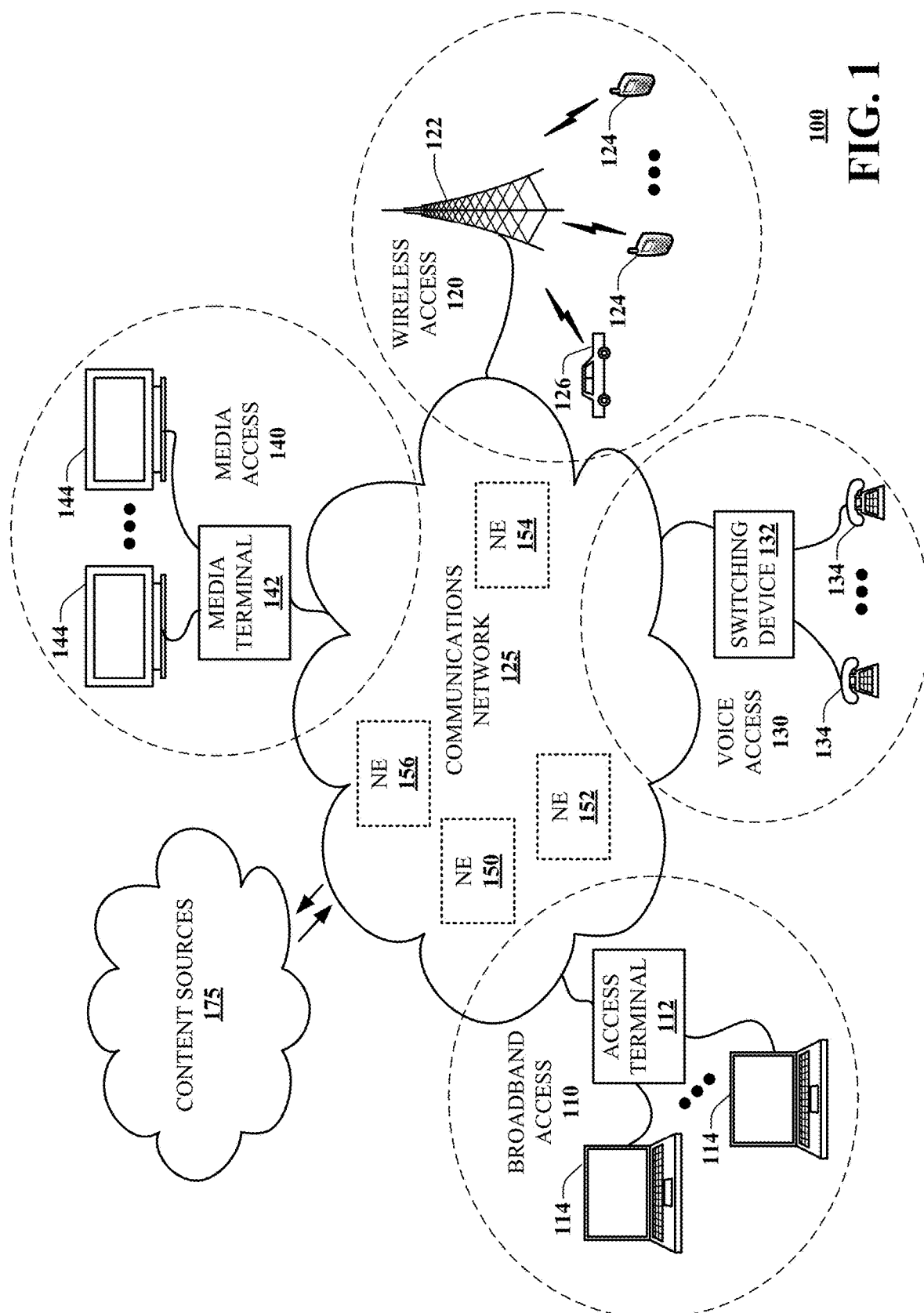
FIG. 1 is a block diagram illustrating an exemplary, non-limiting embodiment of a communications network in accordance with various aspects described herein.

The subject disclosure describes, among other things, illustrative embodiments for identifying a first user associated with a first mobile device, and determining a first user type associated with the first user. Further embodiments can include identifying a first identity associated with the first user based on the first user type and identifying a second identity associated with the first user based on the first user type. Additional embodiments can include providing first alternate content to the first mobile device to mask the first identity and providing second alternate content to the first mobile device associated with the second identity. Other embodiments are described in the subject disclosure.

One or more aspects of the subject disclosure include a device, comprising a processing system including a processor, and a memory that stores executable instructions that, when executed by the processing system, facilitate performance of operations. The operations can comprise identifying a first user associated with a first mobile device and determining a first user type associated with the first user. Further operations can comprise identifying a first identity associated with the first user based on the first user type and identifying a second identity associated with the first user based on the first user type. Additional operations can comprise providing first alternate content to the first mobile device to mask the first identity and providing second alternate content to the first mobile device associated with the second identity.

One or more aspects of the subject disclosure include a machine-readable medium, comprising executable instructions that, when executed by a processing system including a processor, facilitate performance of operations. The operations can comprise identifying a user associated with a mobile device, and determining a user type associated with the user. Further operations can comprise identifying a first identity associated with the user based on the user type and identifying a second identity associated with the user based on the user type. Additional operations can comprise providing first alternate content to the mobile device to mask the first identity and providing second alternate content to the mobile device associated with the second identity. Also, operations can comprise providing an indication to the mobile device to mask first content associated with the first identity stored on the mobile device, wherein the mobile device masks first content associated with the first identity.

One or more aspects of the subject disclosure include a method. The method can comprise identifying, by a processing system including a processing system, a user associated with a mobile device, and determining, by the processing system, a user type associated with the user. Further, the method can comprise identifying, by the processing system, a first identity associated with the user based on the user type and identifying, by the processing system, a second identity associated with the user based on the user type. In addition, the method can comprise providing, by the processing system, first alternate content to the mobile device to mask the first identity and providing, by the processing system, second alternate content to the mobile device associated with the second identity. Also, the method can comprise providing, by the processing system, an indication to the mobile device to mask first content received by the mobile device, wherein the mobile device masks the first content utilizing the first alternate content and the second alternate content in response to receiving the first content.

Referring now to FIG. 1, a block diagram is shown illustrating an example, non-limiting embodiment of a system 100 in accordance with various aspects described herein. For example, system 100 can facilitate in whole or in part identifying a user type associated with a user of a mobile device and providing masking content and undercover content to the mobile device based on the user type. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
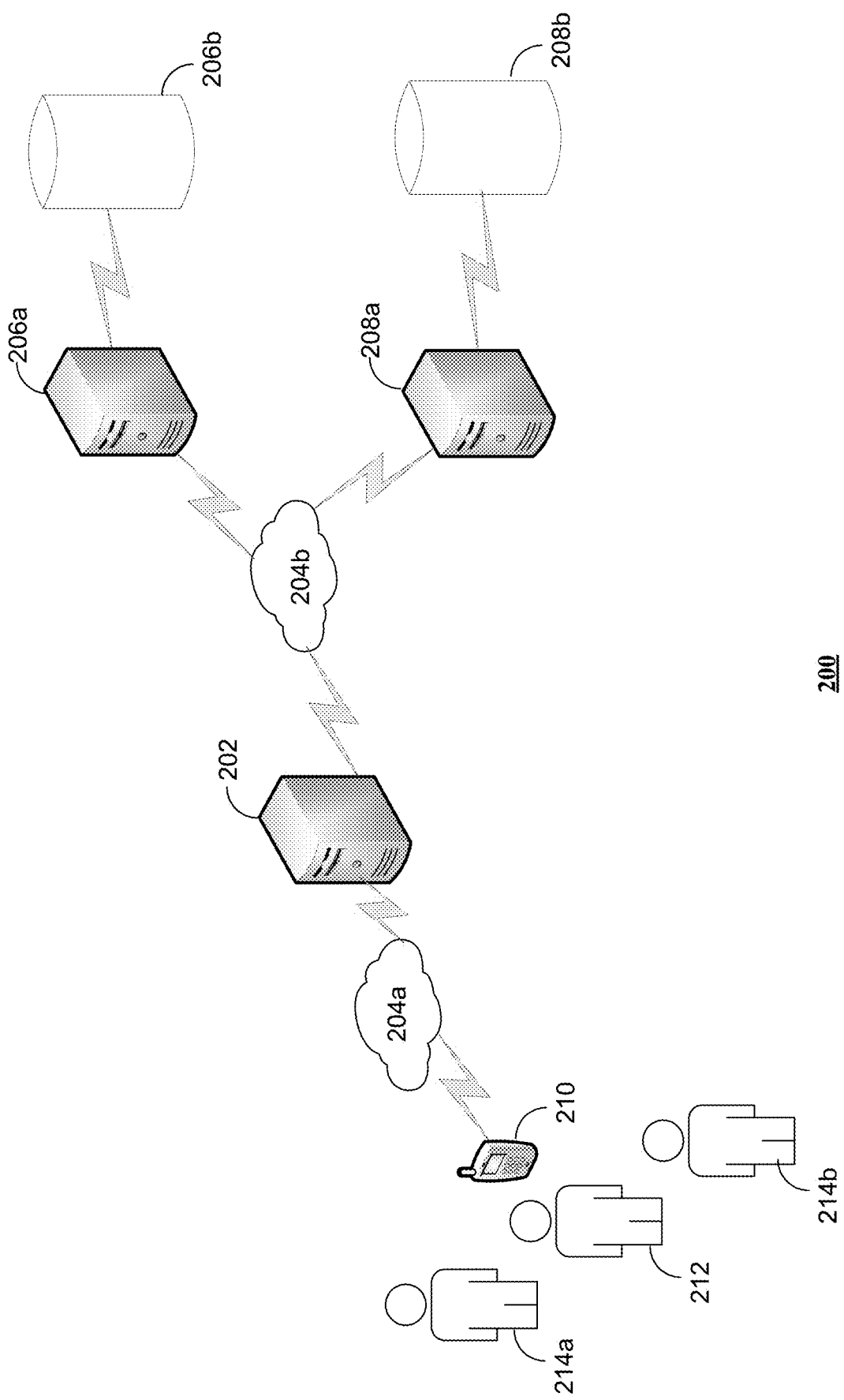

FIGS. 2A-2I are block diagrams illustrating example, non-limiting embodiments of a system functioning within the communication network of FIG. 1 in accordance with various aspects described herein. Referring to FIG. 2A, in one or more embodiments, system 200 can include a masking server 202 communicatively coupled to a mobile device 210 associated with a user 212 over a communication network 204a. Further, masking server 202 can be communicatively coupled to a call detail record server 206a and/or a billing record server 208a over a communication network 204b. In addition, the call detail record server 206a can be communicatively coupled to a call detail record database 206b (or call detail record information repository). In some embodiments, the call detail record database 206b can be stored in or on the same premises as the call detail record server 206a. In other embodiments, the call detail record database 206b can be in a remote location from the call detail record server 206a and communicatively coupled to it over a communication network. Also, the billing record server 208a can be communicatively coupled to a billing record database 208b (or billing record information repository). In further embodiments, the billing record database 208b can be stored in or on the same premises as the billing record server 208a. In additional embodiments, the billing record database 208b can be in a remote location from the billing record server 208a and communicatively coupled to it over a communication network.

In one or more embodiments, the communication network 204a can include one or more wireless communication networks and/or one or more wired communication networks. Further, the one or more wireless communication networks can include a mobile network. In addition, the mobile network can include a first responder mobile network. Also, the communication network 204b can include one or more wireless communication networks and/or one or more wired communication networks. Further, the one or more wireless communication network can include a mobile network. The masking server 202, call detail record server 206a, and billing record server 208a can be one server or multiple servers in one location or spanning more than one location, one or more cloud servers, or one or more virtual servers. In addition, the mobile device 210 (as well as other mobile devices described herein) can be a mobile phone, tablet computer, laptop computer, smartwatch, wearable device, or any other computing device that can communicatively couple to a first responder mobile network.

One example described herein discusses embodiments pertaining to an undercover law enforcement officer, however, the embodiments described herein can be used to mask the identity of any first responder on her/his mobile device including, but not limited to, police officers, firefighters, emergency medical technicians (EMTs), etc. Further, bad actors can be individuals that are (or may desire to be) engaging in criminal activity but the embodiments described herein can be applied in situations to mask the identity of first responders from other people that may interfere with an investigation of a law enforcement officer or a first responder dealing with an emergency situation.

In one or more embodiments, user 212 can be an undercover law enforcement officer who can be surrounded by bad actors 214a and 214b who, in turn, are subjects to an investigation by user 212. Further, the mobile device 210 can be communicatively coupled to the first responder mobile network that can be part of communication network 204a. There are advantages for the mobile device 210 to be communicatively coupled to a first responder mobile network rather than a commercial mobile network that can include prioritizing data messages (email, text, etc.) and voice calls, more coverage, less dropped calls, encryption, etc. between law enforcement officers such that they receive timely information to prevent harm to people in the cities and town where they are located. However, in some instances, bad actors 214a, 214b may want to check the identity of user 212 and thereby may inspect her/his mobile device 210 to see whether there is any indication that user 212 is an undercover law enforcement officer. Embodiments described herein can provide different content by the masking server 202 to mobile device 210 to mask the real identity of user 212, as well bolster the undercover identity of user 212.

In one or more embodiments, the masking server 202 can detect a mobile device 210 on a first responder mobile network. Further, the masking server 202 can identify user 212 associated with the mobile device 210. In addition, the masking server 202 can examine a database in its memory or stored remotely to determine a user type of user 212. That is, whether the user type for user 212 is "undercover" or an "overt" law enforcement officer ("overt" meaning a uniformed officer, or the like). If the user type for user 212 is "undercover," then the masking server 202 can identify a user's real identity based on the user type and identify the user's undercover identity based on the user type. This information can be stored in a database in the masking server 202 or communicatively coupled to it but remotely located. Further, the masking server 202 can provide the mobile device 210 with alternate content to mask the real identity of the user 212 and/or alternate content to bolster (or associated with) the undercover identity of the user 212. The mobile device 210, in turn, can replace content indicating the real identity of user 212 on the mobile device 210 with the alternate content to mask the real identity (in some embodiments, the content indicating the real identity of the user can remain stored on mobile device 210 but is encrypted such that user 212 can access it with corresponding decryption). This masking alternate content can be presented on the display of mobile device 210 for the bad actors 214a, 214b to view, accordingly. Further, the mobile device 210 can store and present alternate content associated with the undercover identity (i.e., undercover content) on the mobile device, accordingly. In some embodiments, portions of the masking alternate content and undercover alternate content can be the same.

Figure 2B:
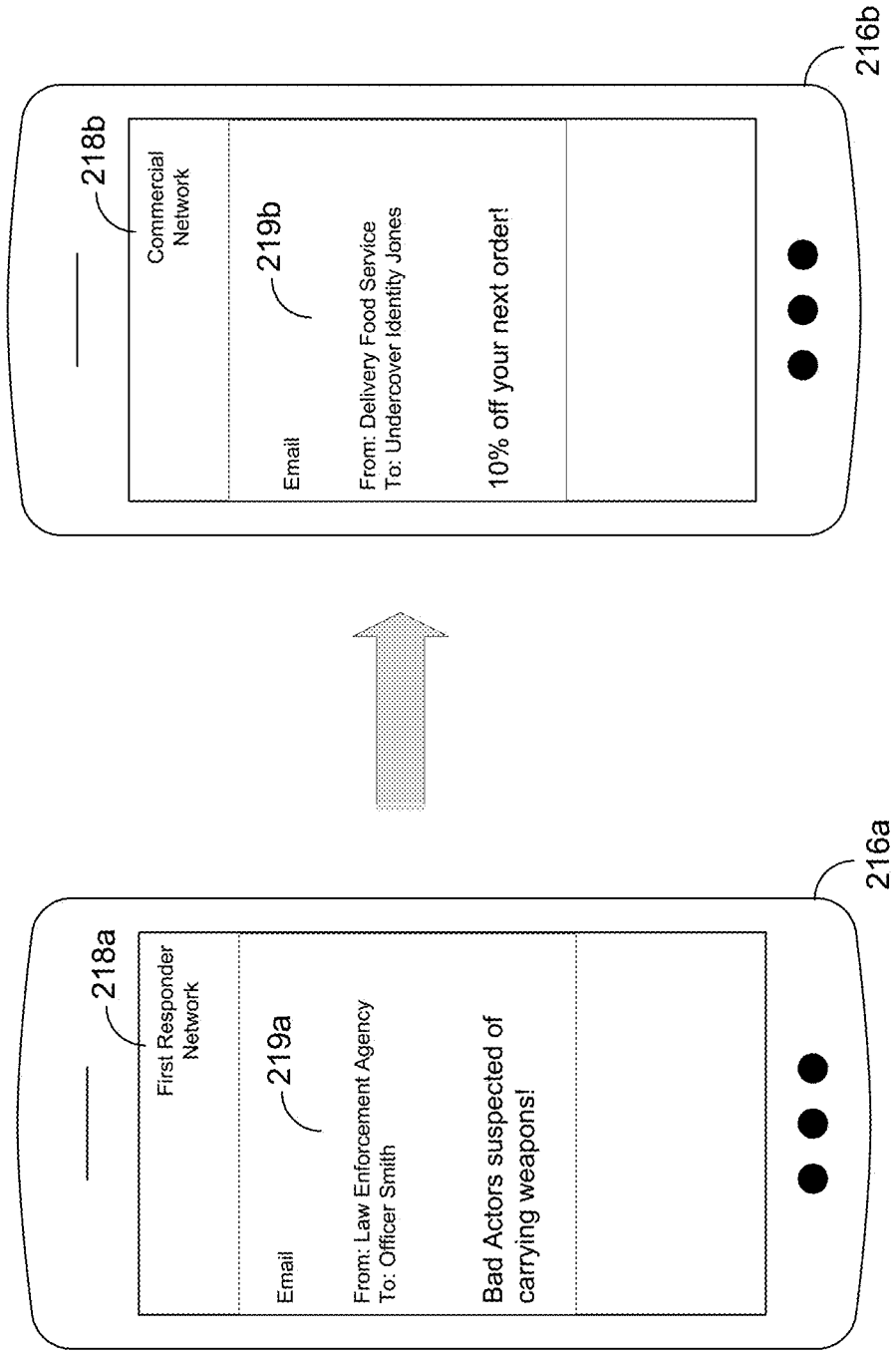

Referring to FIG. 2B, in one or more embodiments, the masking server 202 can provide an indication (e.g., message, notification, alert, signal etc.) to the mobile device 210 to mask the content associated with the user's real identity with masking content. For example, the mobile device 210 may present content 216a associated with the user's real identity that can include the alpha tag 218a indicating the mobile device 210 is communicatively coupled to a first responder mobile network. Further, the content 216a can include email content 219a that indicates more dangerous situations (bad actors 214a, 214b are suspected to be carrying weapons). However, after receiving an indication from the masking server 202 to mask content indicating the real identity of user 212 and receiving masking content and undercover content, the mobile device can store the masking content as well as the undercover content and present a portion of the masking content/undercover content 216b that can include the alpha tag 218b indicating a commercial mobile network and email content 219b associated with the undercover identity.

Figure 2C:
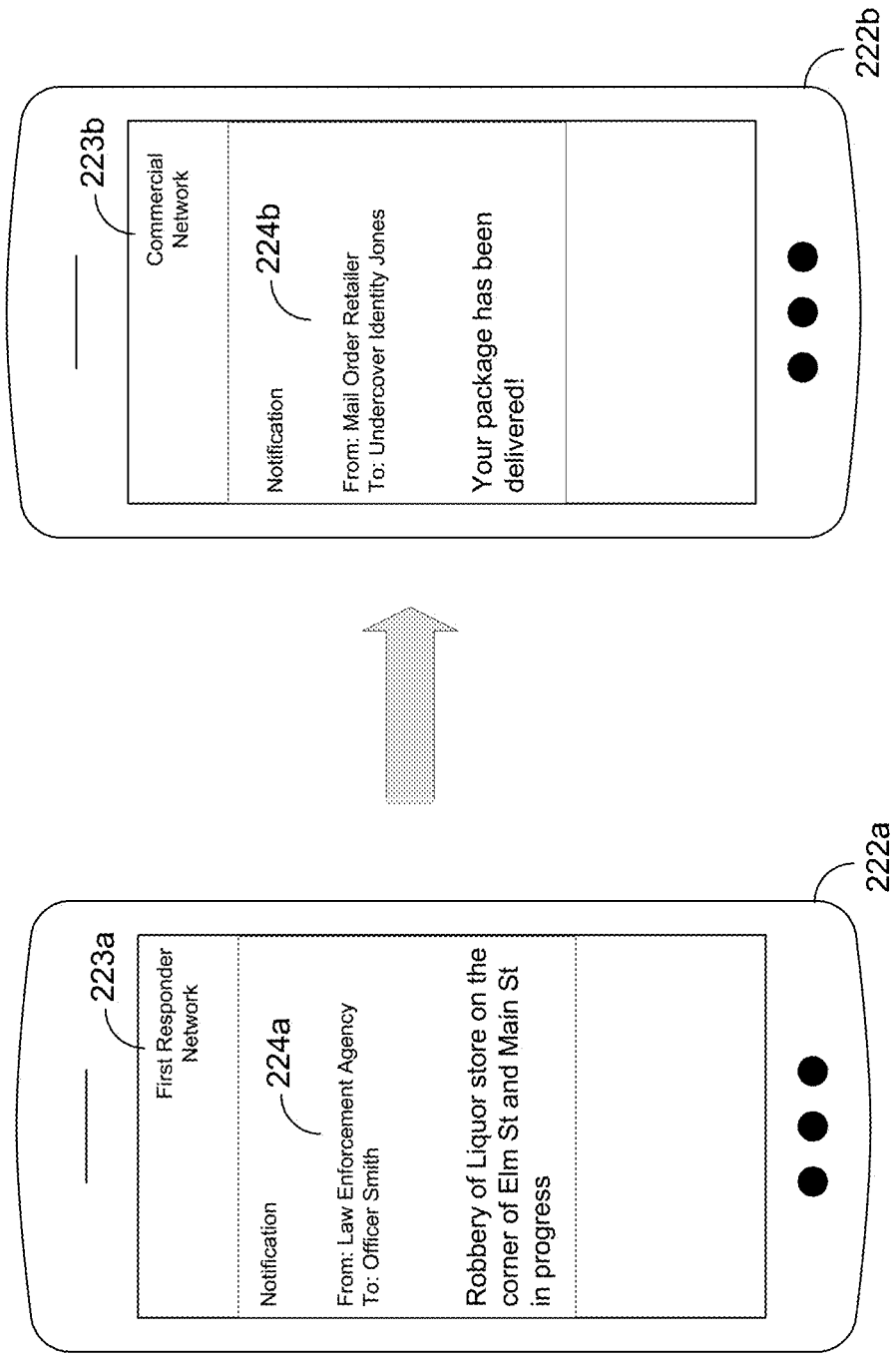

Referring to FIG. 2C, in one or more embodiments, the masking server 202 can provide an indication (e.g., message, notification, alert, signal, etc.) to mobile device 210 to mask content received over the first responder mobile network that indicate the user's real identity. For example, the content 222a can include presenting a notification 224a to user 212 that indicates a robbery is in progress. However, after receiving the indication from the masking server 202, the mobile device can present on content 222b, which includes a notification 224b (instead of notification 224a) that indicates a package has been received by the undercover identity. Further, the notification 224a can be stored in a quarantined or an encrypted storage area (on mobile device 210 itself or accessible remotely by mobile device 210) that requires decryption to access. In other embodiments, the content 222a includes alpha tag 223a indicating a first responder network but content 222b includes alphas tag 223b indicating a commercial network (even though the mobile device 210 is still communicatively coupled to the first responder network).

Referring to FIG. 2D, in one or more embodiments, the masking server 202 can provide an indication (e.g., message, notification, alert, signal etc.) to the mobile device 210 to mask social media content associated with the user's real identity with masking content and/or with undercover content. For example, the mobile device 210 may present content 226a associated with the user's real identity that can include the alpha tag 227a indicating the mobile device 210 is communicatively coupled to a first responder mobile network. Further, the content 226a can include social media content 228a associated with the real identity of user 212. However, after receiving an indication from the masking server 202 to mask content indicating the real identity of user 212 and receiving masking content and undercover content, the mobile device can store the masking content/undercover content and present a portion of the masking content/undercover content 226b that can include the alpha tag 227b indicating a commercial mobile network and social media content 228b associated with the undercover identity.

Figure 2E:
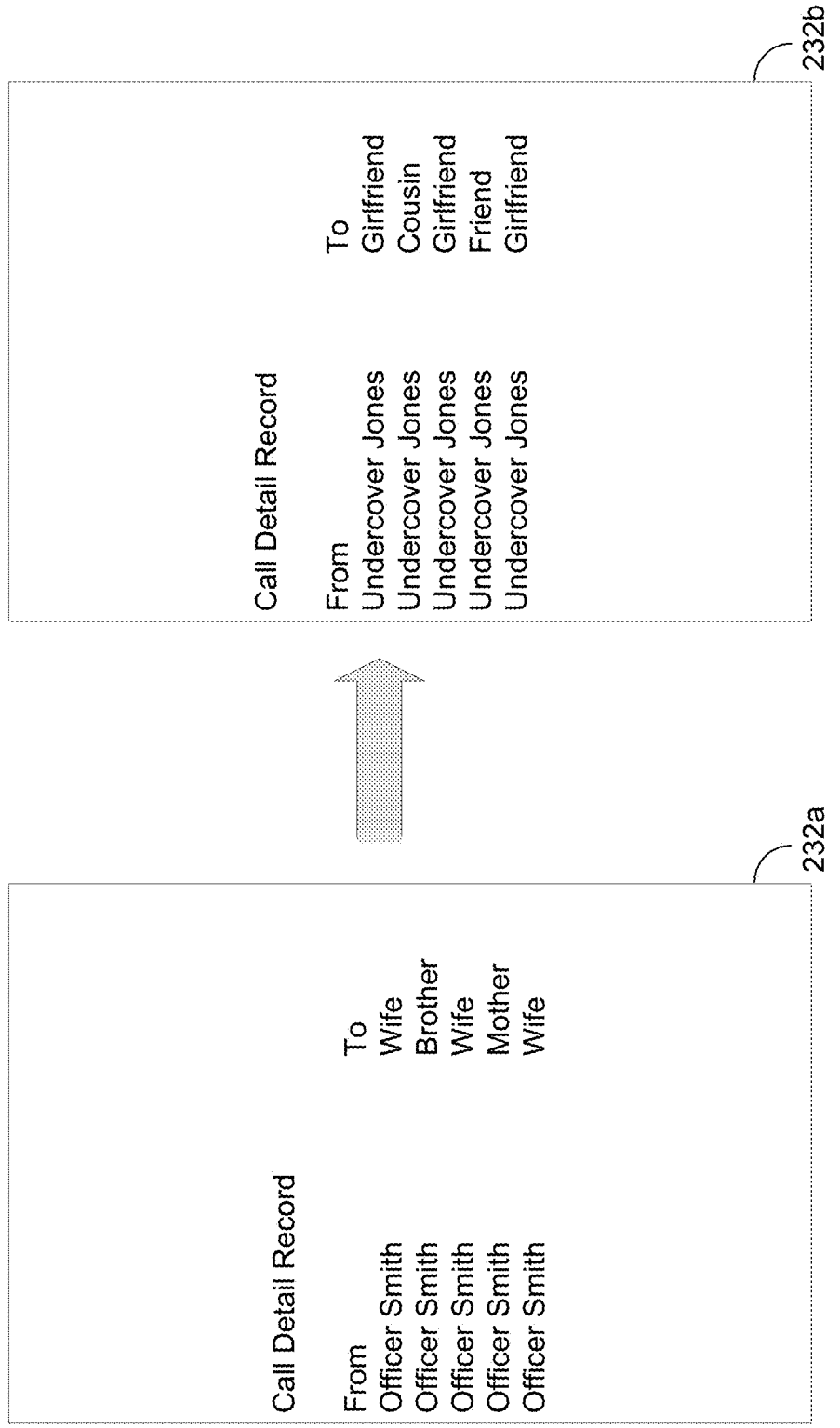

Referring to FIG. 2E, in one or more embodiments, the masking server 202 can provide alternate content to a call detail record server 206a associated with a call detail record database 206b (e.g., call detail record repository). Further, the call detail record database 206b may have a call detail record 232a associated with the real identity of user 212. In one embodiment, in the event that a bad actor 214a, 214n were able to obtain such a call detail record 232a from the call detail record database 206b through bad faith, the call detail record server 206a can store alternate content that comprises call detail record 232b, which is associated with the user's undercover identity. For example, if a query to the call detail record database 206b is for call detail record 232a, the call detail record server 206a can retrieve call detail record 232b instead, to mask the user's real identity and bolster the user's undercover identity to any bad actor or associate/agent of the bad actor.

Figure 2F:
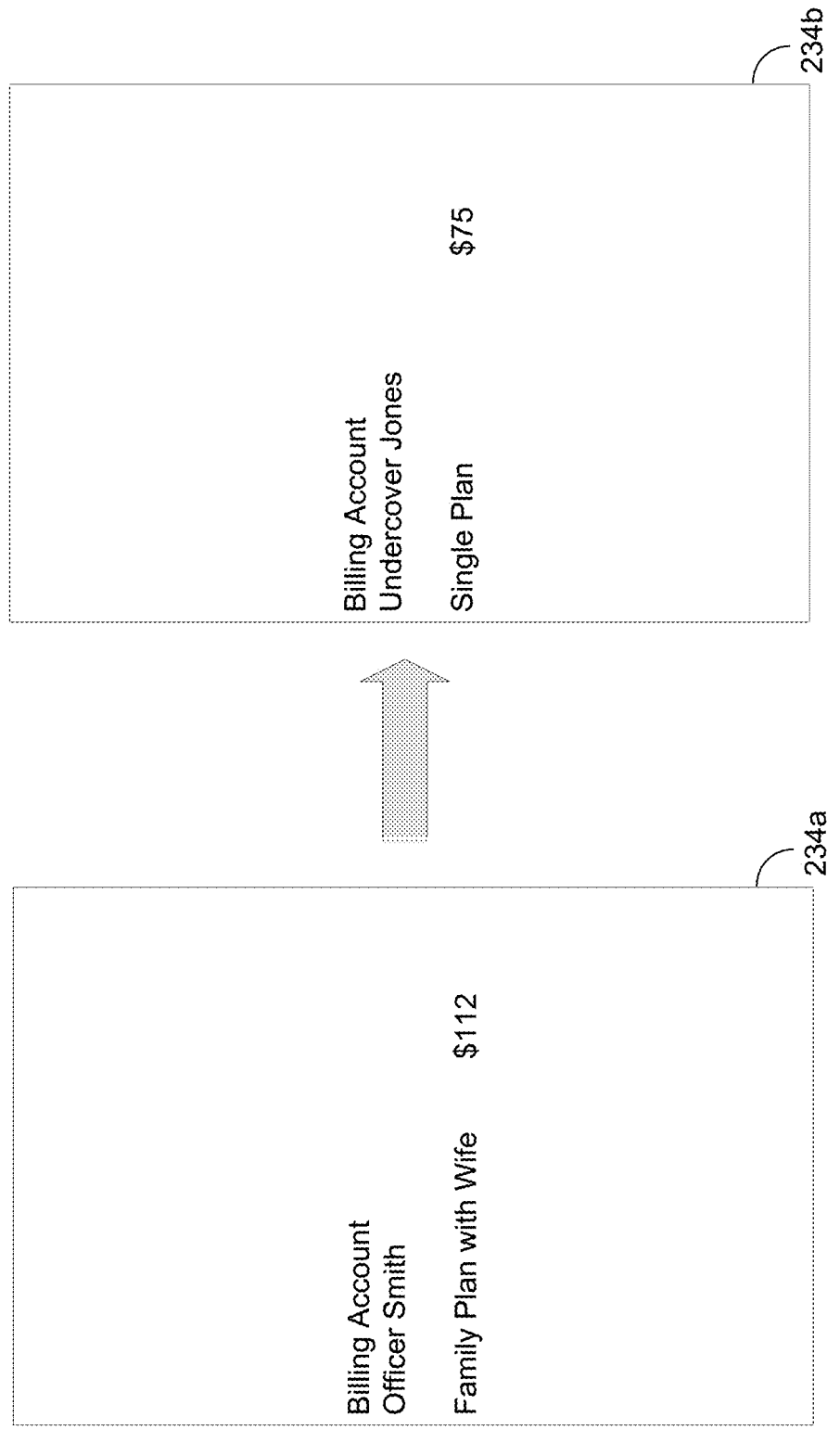

Referring to FIG. 2F, in one or more embodiments, the masking server 202 can provide alternate content to a billing record server 208a associated with a billing record database 208b (e.g., billing record repository). Further, the billing record database 208b may have a billing record 234a associated with the real identity of user 212. In one embodiment, in the event that a bad actor 214a, 214n is able to obtain such a billing record 234a from the billing record database 208b through bad faith, the billing record server 208a can store alternate content that comprises billing record 234b, which is associated with the user's undercover identity. For example, if a query to the billing record database 208b is for billing record 234a, the billing record server 208a can retrieve billing record 234b instead, to mask the user's real identity and bolster the user's undercover identity to any bad actor or associate/agent of the bad actor.

Figure 2G:
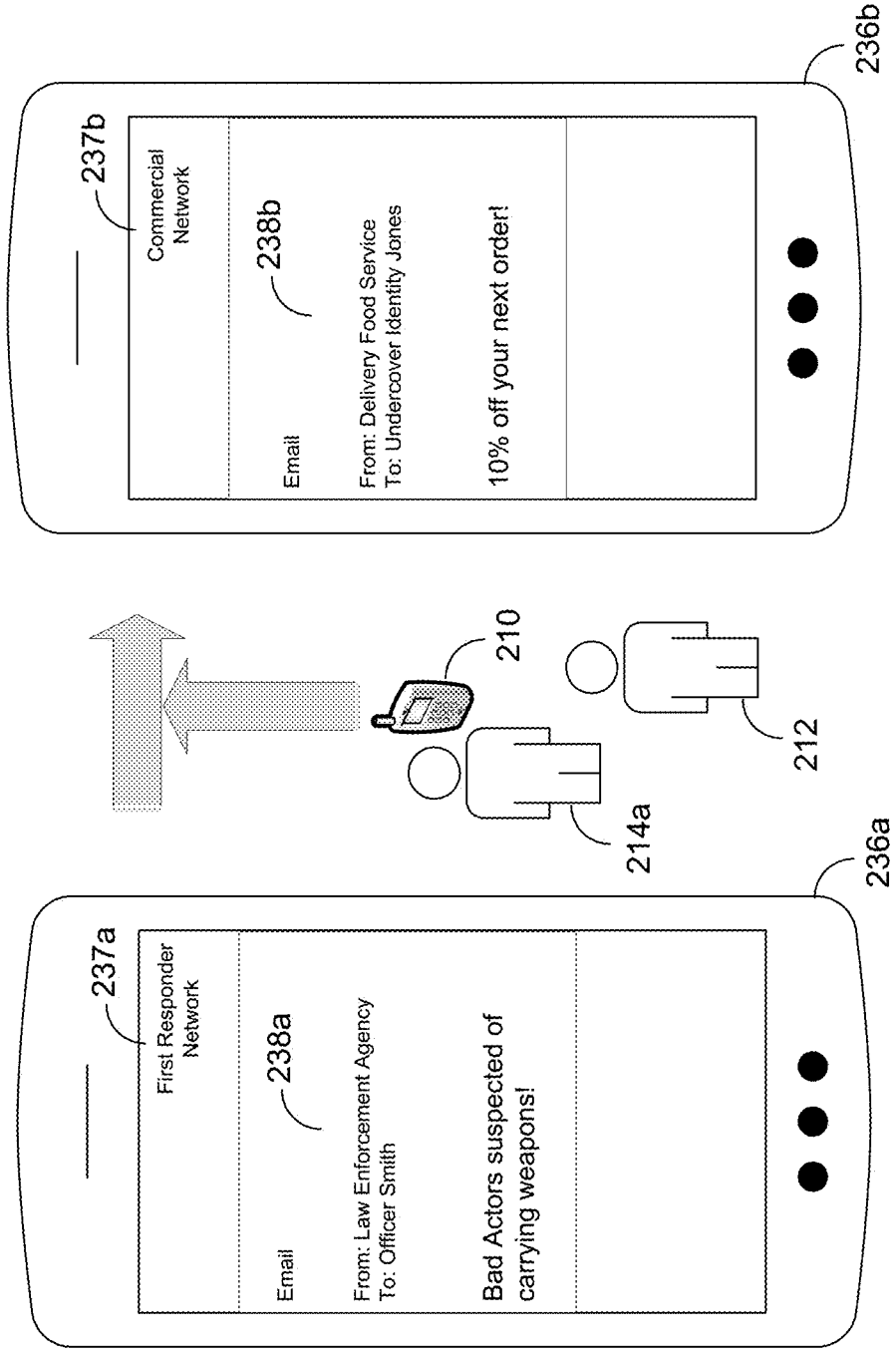

Referring to FIG. 2G, in one or more embodiments, user 212 may be in the company of bad actors 214a, 214a. Further, a bad actor 214a may suspect that user 212 is an undercover law enforcement officer and may want to inspect mobile device 210 to ensure that he/she is not so. Thus, when the bad actor 214a faces the display of mobile device 210, a camera associated with the mobile device 210 captures an image of bad actor 214a. Further, the mobile device 210 can determine that the image of the bad actor is not user 212 in response to performing facial recognition techniques on the captured image that can include comparing the captured image with a previously stored image of the user 212 in the memory of the mobile device 210. Subsequently, the mobile device 210 can mask content 236a displayed on mobile device 210 that includes an alpha tag 237a and email content 238a that is associated with the user's real identity with alternate content 236b that can include alpha tag 237b and email content 238b associated with the user's undercover identity.

Figure 2H:
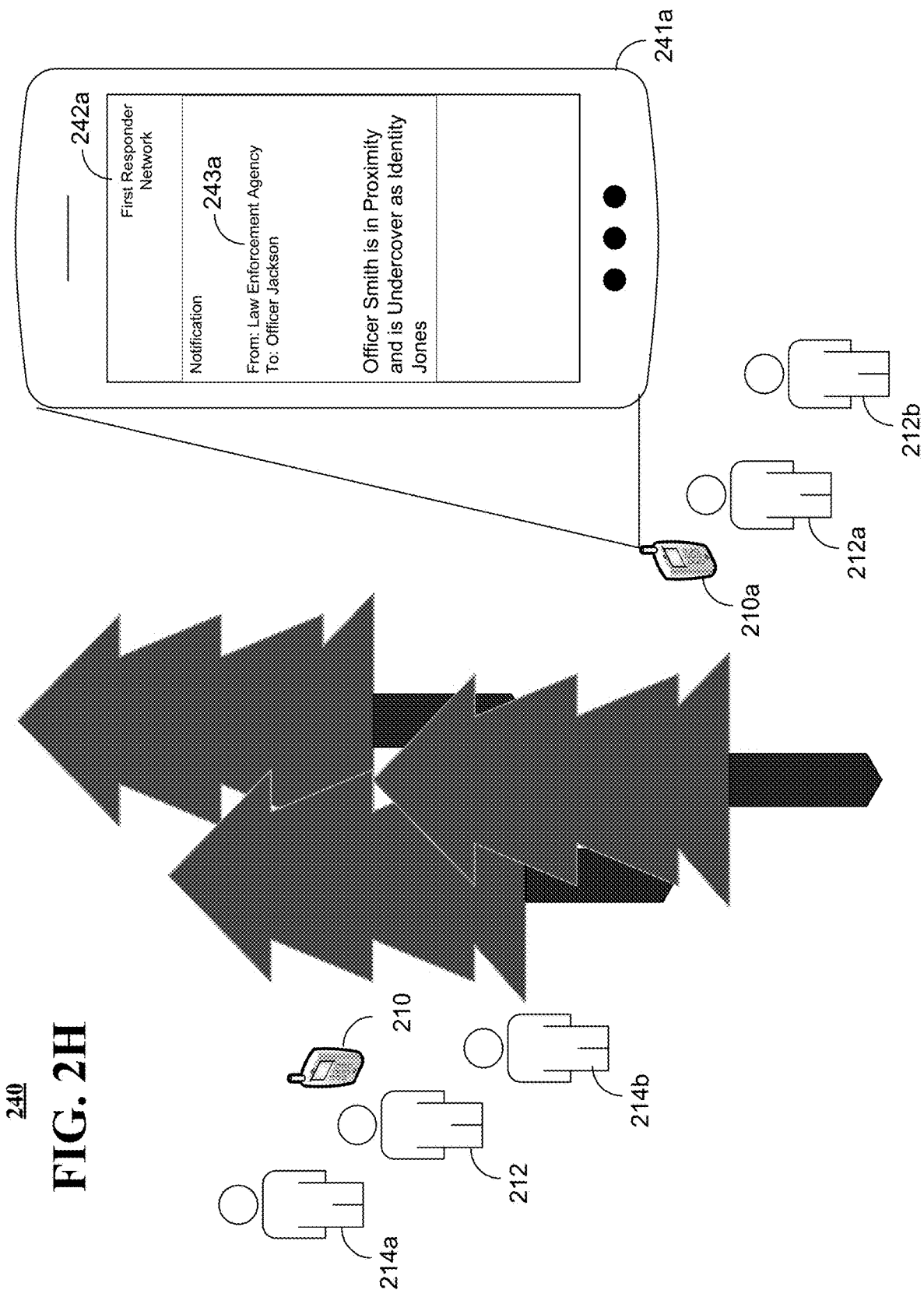

Referring to FIG. 2H, in one or more embodiments, the user 212 may be in the company of bad actors 214a, 214b using the undercover identity in a public place such as a park. Other law enforcement officers 212a, 212b may be approaching user 212 and bad actors 214a, 214b. The law enforcement officers 212a, 212b may be uniformed officers on a routine patrol but are suspicious of user 212 and bad actors 214a, 214b being in the park (e.g., it may be late at night). Masking server 202 can detect mobile device 210a associated with law enforcement officer 212a and determine that is it within a distance threshold of mobile device 210 and also determine that the trajectory of mobile device 210a is towards mobile device 210. In response to at least one of these determinations, the masking server 202 can transmit a notification 243a to mobile device 210a over the first responder mobile network indicating that user 212 is an undercover law enforcement officer and is in proximity to mobile device 210a. The notification 243a can be presented on display 241a and can include the alpha tag 242a indicating mobile device 210a is communicatively coupled to the first responder mobile network. Further, the notification 243a can provide undercover identity content of user 212 such as an image of user 212 such that law enforcement officer 212a can recognize user 212. Thus, the notification 243a ensures that user 212 continues to be undercover and that law enforcement officer 212a will not expose the undercover identity of user 212 or the investigation of bad actors 214a, 214b by user 212.

Referring to FIG. 2I, in one or more embodiments, user 212 can be in proximity of another user 212c, which is associated with mobile device 210b. User 212c can also be a law enforcement officer utilizing an undercover identity and partnering with user 212 to investigate bad actors 214a, 214b. Further, the masking server 202 can detect mobile device 210b is associated with a law enforcement agency (or some other civil entity), and identify user 212c associated with mobile device 210b. In addition, the masking server 202 can determine a user type associated with user 212c. The user type can be "undercover" or "overt." If the masking server 202 determines that the user type is "undercover," then the masking server 202 can identify the real identity and the undercover identity of user 212c, as described herein for user 212. That is, the real identity and undercover identity of user 212c can be stored in a database communicatively coupled to masking server 202. Also, the masking server 202 can provide masking content and undercover content to mobile 210b. Further, the information stored in the database associated with undercover identity of user 212c can indicate that the undercover identity of user 212c is related to the undercover identity of user 212. Thus, the masking content and undercover content provided to mobile device 210b can be related to the masking content and undercover content provided to mobile device 210. For example, mobile device 210b can include content 246a associated with the real identity of user 212c that include alpha tag 247a and email content 248a. However, masking content and/or undercover content can include content 246b that can comprise alpha tag 247b and email content 248b. Further, email content 248b can indicate that the undercover content for user 212c is the cousin of the undercover identity of user 212, bolstering both the undercover identity of user 212 and the undercover identity of user 212c during the investigation of bad actors 214a, 214b, if content 246b is ever inspected by bad actors 214a, 214b.

Figure 2J:
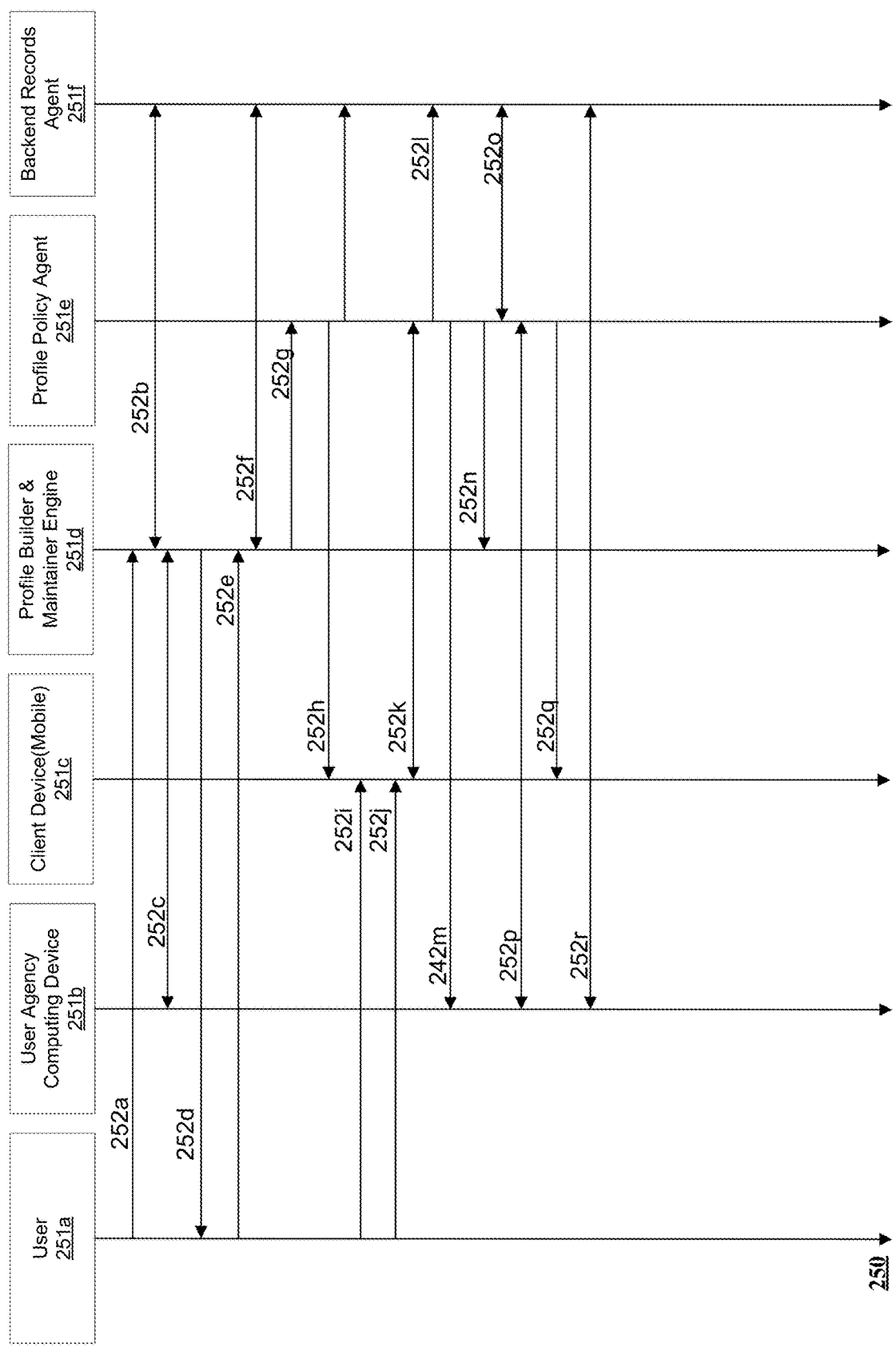
FIGS. 2J-2L depict illustrative embodiments of methods in accordance with various aspects described herein.
Figure 2K:
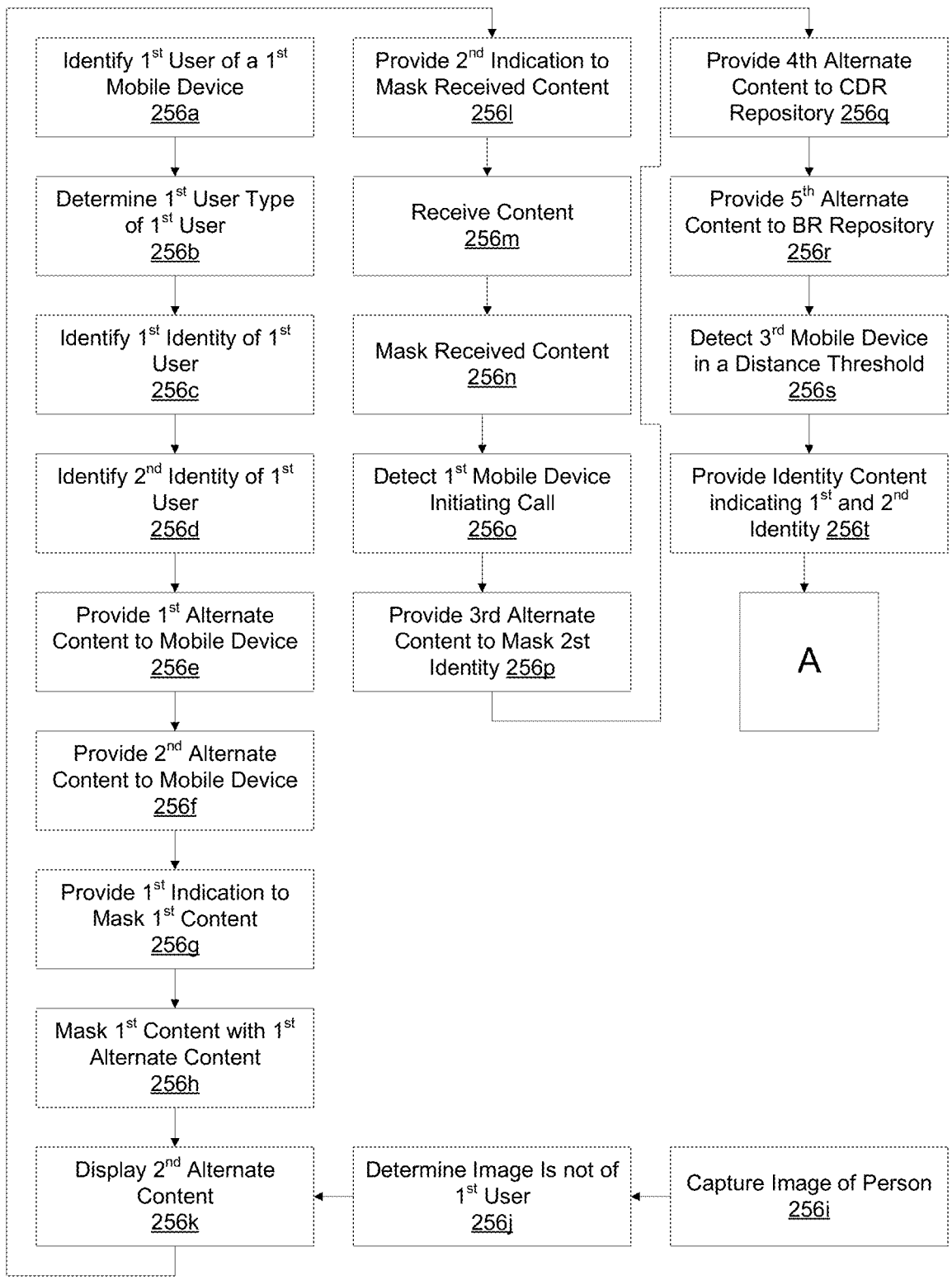
Figure 2L:
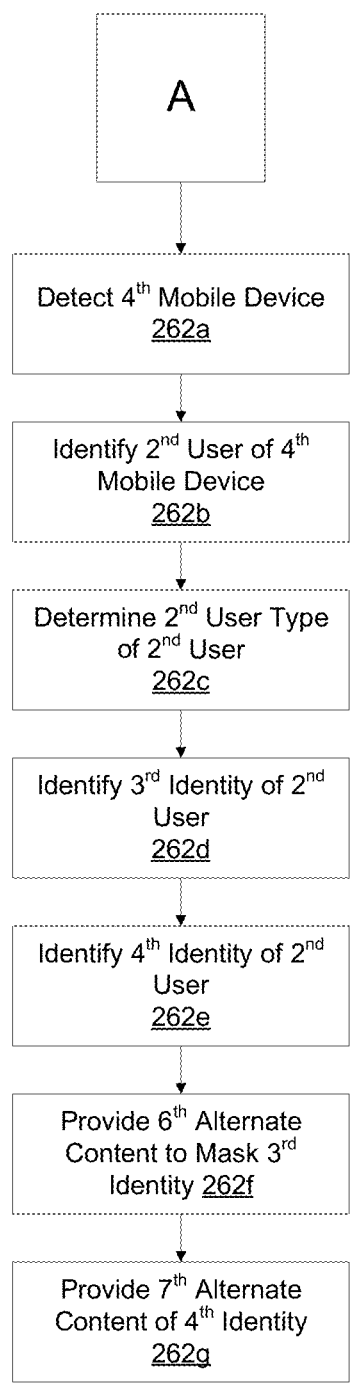

FIGS. 2J-2L depict illustrative embodiments of methods in accordance with various aspects described herein. Referring to FIG. 2J, in one or more embodiments, portions of method 250 can be implemented by a user 251a, a user agency computing device 251b, a client (mobile) device 251c associated with the user, a profile builder & maintainer engine 251d, a profile policy agent 251e, and a backend records agent 251f. In some embodiments, all or some of the profile builder & maintainer engine 251d, profile policy agent 251e, and backend records agent 251f can be incorporated by a group of masking servers. Further, a portion of the group of masking servers can be operated by a law enforcement agency (or a civil entity) and/or a portion of the group of masking servers can be operated by the operator of a first responder mobile network.

In one or more embodiments, the method 250 can include activating a standard normal line of service of the client device 251c associated with the user 251a on a first responder mobile network. The user or enterprise (e.g., law enforcement agency, civil entity, etc.) can opt-in for an identity masking service for user 251a that is assuming an undercover identity. This service can include establishing a connection with service provider associated with the first responder mobile network for a number of accounts, activity, conditions for masking, and increased credential users as well as individuals with a personal mobile device working for the enterprise can use the service to reduce multiple SIM utility.

In one or more embodiments, the service begins to build mapped behavior and an account. This can include private details being scrubbed/encrypted for privileged provider access as well as a list of questions and desired details can be provided during initial activation and behavior. Further, call detail records can be created to match desired behavior (e.g., undercover identity). In addition, the method 250 can include reusing a prior undercover identity that matches behavior (e.g., mapped identity that was discarded/unused can be reused). Also, the mapped identity policies propagated to the client device (e.g., alpha tag, undercover identity, account details, etc.).

In one or more embodiments, the method 250 can include maintaining a dual log during normal operation of masking service. This can include the masked identity and mapped identity being maintained in different records, as well as service can be turned on or off based on user activity or manual switch. Further, profile updates and scrubbing of backend data can be proactively performed by an agent (e.g., human and/or artificial intelligence) to maintain alignment with masked profile. In further embodiments, upon termination, updated behaviors from call detail records and activity for future modeling and mapping of identities can be performed. Further, the system can forward account details to an alternate account (e.g., mapped identity can go dormant). In addition, all account details are archived for future use.

In one or more embodiments, the method 250 can include, at 252a, a user opting-in for masking service. Further, the method 250 can include, at 252b, querying and building (or reusing old) profile based on masked requirements. In addition, the method 250 can include, at 252c, building enterprise masking account details and seeking authorization. Also, the method 250 can include, at 252d, updating potential masked identity. The method 250 can include, at 252e, providing user feedback for approval or additional revisions. Further, the method 250 can include, at 252f, personalizing based on required call detail records or other account connectivity. In addition, the method 250 can include, at 252g, stating a law enforcement agent for monitoring and updates. Also, the method 250 can include, 252h, enforcing profile tags (alpha), connectivity (first responder mobile network), and data restrictions. The method 250 can include, at 252i, conducting normal or masked operation. Further, the method 250 can include, at 252j, explicitly turning on/off of masking service or memory wipe of client device. In addition, the method 250 can include, at 252k, an agent modifying a routing behavior. Also, the method 250 can include, at 252l, dual logging for all activities. The method 250 can include, at 252m, providing occasional team notifications for masked users that can be anonymized. Further, the method 250 can include, at 252n, providing profile model updates based on masked user behaviors. In addition, the method can include, at 252o, proactively scrubbing of backend data to maintain profile/model behavior. Also, the method 250 can include, at 252p, for termination, each agency determining deletion, and "parking" of prior profiles. The method 250 can include, at 252q, implementing device status reset for masked or original identity. Further, the method can include, at 252r, implementing long-term storage or archival of dual masked logs for reuse or future forensics.

In one or more embodiments, a masking service implemented by the systems and methods described herein can provide protection against social engineering within a service provider because a new identity appears legitimate and accessible only by privileged provider representatives. Further embodiments can include an opportunity for rate-plan (accounting options) that track the addition or removal of masking service as needed instead of a single, fixed account utility, which is associated with the larger sponsoring organization. Additional embodiments, for consumers/enterprises using this masking service, could include programmatically switching activity to a different account (with service provider) based on client activity (e.g., calling out to a number, using a service, etc.). Other embodiments can include unseen level of security and trust for civil and legal authorities with service providers. Further embodiments can manage masking of identity and behavior throughout lifecycle of masking service (e.g., from connected calls to endpoint mobile devices) and restrict potential information or security risks by elevated credentials on both customer and provider interactions. Additional embodiments can provide improved safety and security for civil authorities (officers, first responders, federal agents, their family networks, etc.) with system-enabled protection and identity masking.

In one or more embodiments, with software hoods to third-party vendors, when new identities are created, can also seed various services (e.g., social networks) with appropriate behavior and activities to mirror desired masked identity. Further embodiments can include creation of advanced privacy service as a feature (e.g., line-item consumer add-on) that can mask or reroute a specific action via a different service. Additional embodiments can include a service that can be licensed as a consumer service for the privacy-aware or privacy-requiring consumer operations (e.g., operationalize a child versus a parent usage on the same Subscriber Identity Module (SIM)), either for parent/child separation or protection of a child's account details. Other embodiments can include proactively changing of detected bad behavior to maintain coherence with a profile (e.g., a call to wrong number or outside of network could be scrubbed or rewritten to confirm to original profile definitions (e.g., mis-categorizations of original routing algorithm can be recovered and replaced here—do not put "mom's" number on the undercover masked identity)). Further embodiments can use network date to auto-build a user role/profile library from anonymized data so that new entrants to the service can pick from this library to mimic behavior (e.g., determine political classes, lifestyle behaviors, etc.). Additional embodiments can apply role/profile to a large group instead of an individual (e.g., simulate a network of multiple individuals that may be masked amongst each other or with other non-entrants) to provide additional legitimacy to the call detail record and behavioral records.

Referring to FIG. 2K, in one or more embodiments, portions of method 250 can be implemented by a masking server and/or a mobile device as described herein. Method 255 can include the masking server, at 256a, identifying a first user associated with a first mobile device. Further, the method 255 can include the masking server, at 256b, determining a first user type associated with the first user. In addition, the method 255 can include the masking server, at 256c, identifying a first identity associated with the first user based on the first user type, and, at 256d, identifying a second identity associated with the first user based on the first user type. Also, the method 255 can include the masking server, at 256e, providing first alternate content to the first mobile device to mask the first identity, and, at 256f, providing second alternate content to the first mobile device associated with the second identity.

In one or more embodiments, the method 255 can include the masking server, at 256g, providing a first indication to the first mobile device to mask first content associated with the first identity stored on the first mobile device. Further, the method 255 can include the first mobile device, at 256h, masking first content associated with the first identity with the first alternate content. The method 255 can include the first mobile device, at 256k, to display the first alternate content and/or second alternate content. In addition, the method 255 can include a camera associated with the first mobile device, at 256i, capturing an image of a person facing the first mobile device. Also, the method 255 can include the first mobile device, at 256j, determining the image of the person is not the first user in response to performing facial recognition techniques on the image. Further, the method 255 can include first mobile device, at 256k, presenting, at 256k, the first alternate content and/or the second alternate content on a display of the first mobile device.

In one or more embodiments, the method 255 can include the masking server, at 256l, providing a second indication to the first mobile device to mask second content received by the first mobile device. Further, the method 255 can include the first mobile device, at 256m, receiving the second content. In addition, the method 255 can include the first mobile device, at 256*n*, masking the second content. In some embodiments, the second content can be masked with the first alternate content and/or second alternate content.

In one or more embodiments, the method 255 can include the masking server, at 256*o*, detecting the first mobile device initiating a mobile telephone call to a second mobile device associated with a third party. Further, the masking server, at 256*p*, can provide third alternate content to the second mobile device as caller identification content to mask the first identity.

In one or more embodiments, the method 255 can include the masking server, 256*p*, providing fourth alternate content to a first computing device associated with a call detail record repository. The first computing device stores the fourth alternate content in the call detail record repository to mask the first identity and to disclose the second identity. Further, the method 255 can include masking server, 256*r*, providing fifth alternate content to a second computing device associated with a bill record repository. The second computing device stores the fifth alternate content in the billing record repository to mask the first identity and to disclose the second identity.

In one or more embodiments, the method 255 can include the masking server, at 256*s*, detecting a third mobile device associated with a law enforcement agency (or civil entity) within a distance threshold of the first mobile device. Further, the method 255 can include the masking server, at 256*t*, providing identity content associated with the first user indicating the first identity and the second identity.

In one or more embodiments, the first content, second content, first alternate content, second alternate content (or any alternate content described herein) can comprise one of email content, text message content, social media content, mobile application content, notification content, cloud content, or any combination thereof. In addition, the first mobile device is communicatively coupled to a first responder mobile network.

Referring to FIG. 2L, in one or more embodiments, the method 255 can include the masking server, at 262*a*, detecting a fourth mobile device associated with a law enforcement agency (or civil entity). Further, the method 255 can include the masking server, at 262*b*, identifying a second user associated with the fourth mobile device. In addition, the method 255 can include the masking server, at 262*c*, determining a second user type associated with the second user. Also, the method 255 can include the masking server, at 262*d*, identifying a third identity associated with the second user based on the second user type, and, at 262*e*, identifying a fourth identity associated with the second user based on the second user type. The method 255 can include the masking server, at 262*f*, providing sixth alternate content to the fourth mobile device to mask the third identity, and, at 262*g*, providing seventh alternate content to the fourth mobile device associated with the fourth identity.

Also, in some embodiments, the first alternate content is different than the sixth alternate content and the second alternate content is different than the seventh alternate content. In other embodiments, the sixth alternate content and the seventh alternate content are complementary to the first alternate content and the second alternate content because the first user and the second user are partnering with each other to investigate the same group of bad actors.

While for purposes of simplicity of explanation, the respective processes are shown and described as a series of blocks in FIGS. 2J-2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, some portions of the embodiments described herein can be combined with other embodiments described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200, 215, 220, 225, 230, 233, 235, 240, 245, and methods 250, 255, 20 presented in FIGS. 1, 2A-2L, and 3. For example, virtualized communication network 300 can facilitate in whole or in part identifying a user type associated with a user of a mobile device and providing masking content and undercover content to the mobile device based on the user type.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
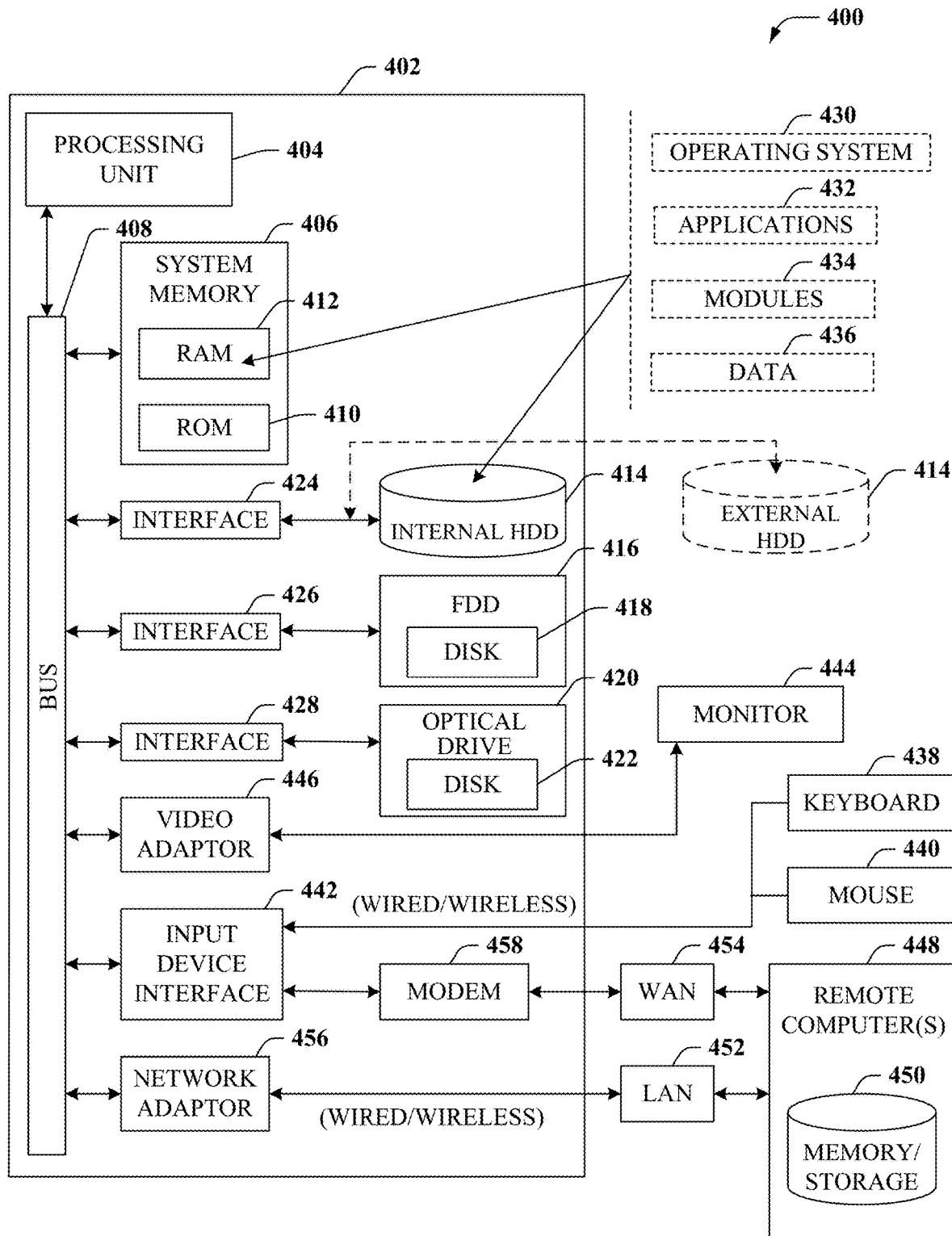
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a user type associated with a user of a mobile device and providing masking content and undercover content to the mobile device based on the user type. Further, servers 202, 206a, 208a, databases 206b, 208b, mobile devices 210, 210a, 210b, user agency computing device 251b, client device 251cm profile builder & maintainer engine 251d, profile policy agent 251e, and backend records agent 251f can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
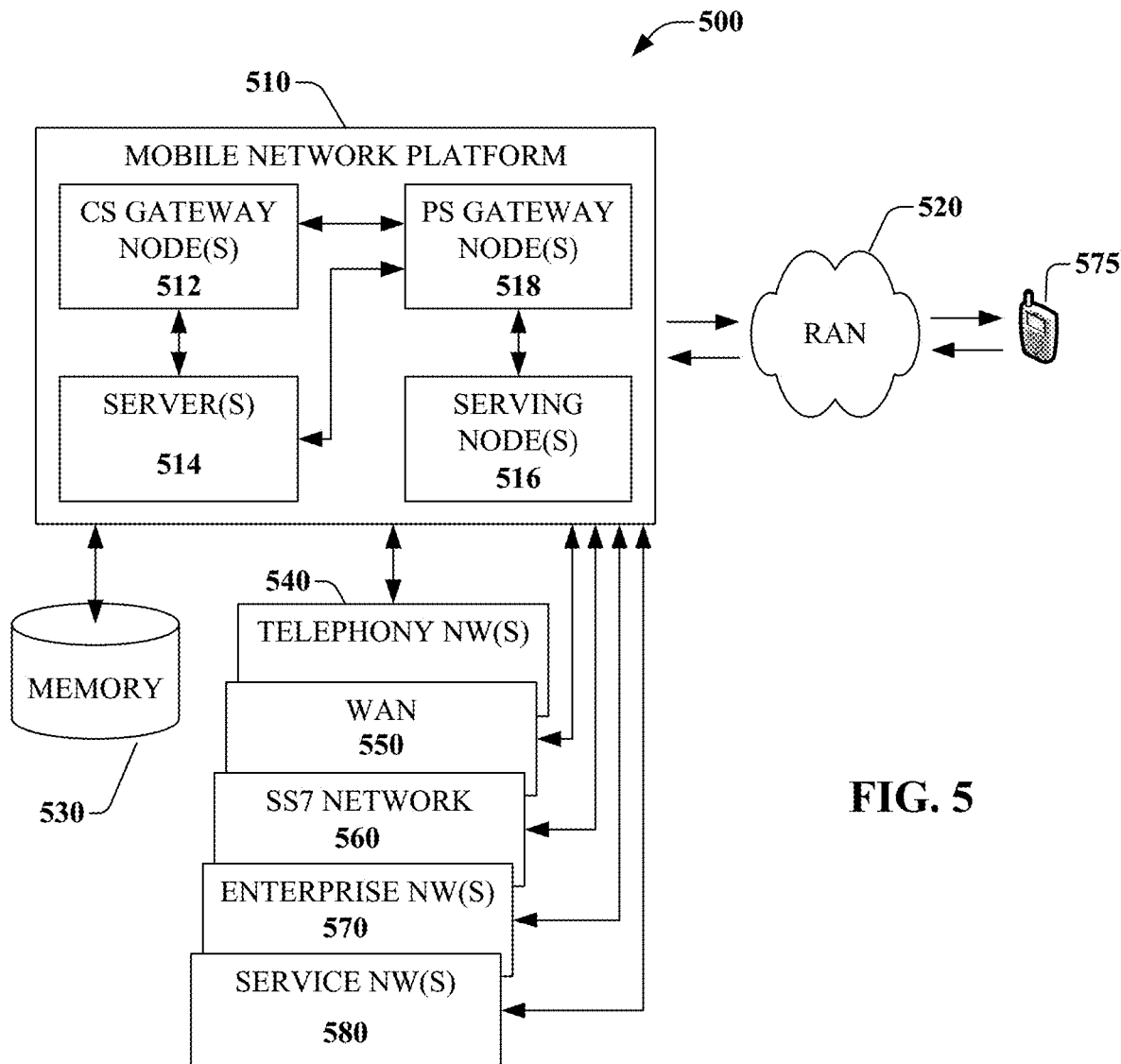
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a user type associated with a user of a mobile device and providing masking content and undercover content to the mobile device based on the user type. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
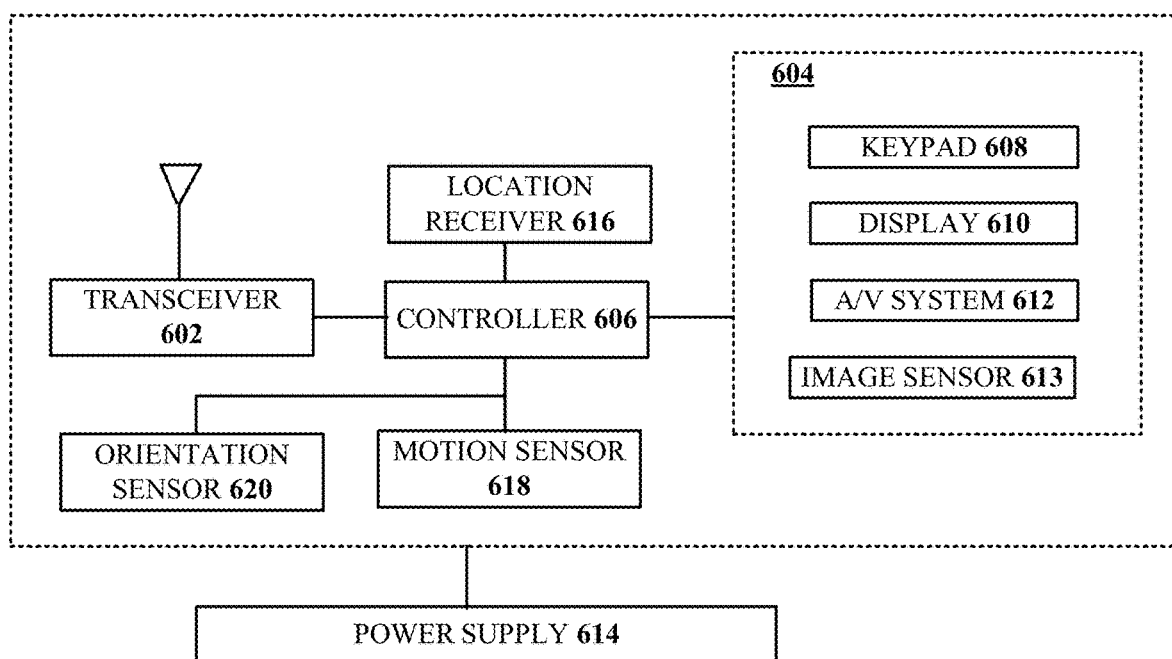
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part identifying a user type associated with a user of a mobile device and providing masking content and undercover content to the mobile device based on the user type. Further, servers 202, 206a, 208a, databases 206b, 208b, mobile devices 210, 210a, 210b, user agency computing device 251b, client device 251cm profile builder & maintainer engine 251d, profile policy agent 251e, and backend records agent 251f can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   identifying a first user associated with a first mobile device;
   determining a first user type associated with the first user;
   identifying a first identity associated with the first user based on the first user type and identifying a second identity associated with the first user based on the first user type;
   providing first alternate content to the first mobile device to mask the first identity and providing second alternate content to the first mobile device associated with the second identity;
   detecting a second mobile device associated with a civil entity;
   identifying a second user associated with the second mobile device;
   determining a second user type associated with the second user;
   identifying a third identity associated with the second user based on the second user type and identifying a fourth identity associated with the second user based on the second user type; and
   providing third alternate content to the second mobile device to mask the third identity and providing fourth alternate content to the second mobile device associated with the fourth identity.

2. The device of claim 1, wherein the operations further comprise providing a first indication to the first mobile device to mask first content associated with the first identity stored on the first mobile device, wherein the first mobile device masks the first content associated with the first identity with the first alternate content.

3. The device of claim 2, wherein a camera associated with the first mobile device captures an image of a person facing the first mobile device, wherein the first mobile device determines the image of the person is not the first user in response to performing facial recognition techniques on the image, wherein the first mobile device masks the first content and presents the first alternate content and the second alternate content on a display of the first mobile device.

4. The device of claim 2, wherein the first content comprises one of email content, text message content, social media content, mobile application content, notification content, cloud content, or a combination thereof.

5. The device of claim 1, wherein the operations further comprise providing a second indication to the first mobile device to mask second content received by the first mobile device, wherein the first mobile device masks the second content in response to receiving the second content.

6. The device of claim 5, wherein the second content comprises one of email content, text message content, social media content, mobile application content, notification content, cloud content, or a combination thereof.

7. The device of claim 1, wherein the operations comprise:
   detecting the first mobile device initiating a mobile telephone call to a third mobile device associated with a third user; and
   providing fifth alternate content to the third mobile device as caller identification content to mask the first identity.

8. The device of claim 1, wherein the operations comprise providing fifth alternate content to a first computing device associated with a call detail record repository, wherein the first computing device stores the fifth alternate content in the call detail record repository to mask the first identity and to disclose the second identity.

9. The device of claim 1, wherein the operations comprise providing fifth alternate content to a second computing device associated with a bill record repository, wherein the second computing device stores the fifth alternate content in the billing record repository to mask the first identity and to disclose the second identity.

10. The device of claim 1, wherein the first mobile device is communicatively coupled to a first responder mobile network.

11. The device of claim 1, wherein the operations comprise:
detecting a third mobile device associated with a civil entity within a distance threshold of the first mobile device; and
providing identity content associated with the first user indicating the first identity and the second identity.

12. The device of claim 1, wherein the first alternate content is different than the third alternate content and the second alternate content is different than the fourth alternate content.

13. The device of claim 1, wherein the third alternate content and the fourth alternate content are complementary to the first alternate content and the second alternate content.

14. A non-transitory, machine-readable medium, comprising executable instructions that, when executed by a processing system including a processor, facilitate performance of operations, the operations comprising:
identifying a user associated with a mobile device;
determining a user type associated with the user;
identifying a first identity associated with the user based on the user type and identifying a second identity associated with the user based on the user type;
providing first alternate content to the mobile device to mask the first identity and providing second alternate content to the mobile device associated with the second identity;
providing an indication to the mobile device to mask first content associated with the first identity stored on the mobile device, wherein the mobile device masks the first content associated with the first identity;
detecting another mobile device associated with a civil entity;
identifying another user associated with the another mobile device;
determining another user type associated with the another user;
identifying a third identity associated with the another user based on the another user type and identifying a fourth identity associated with the another user based on the another user type; and
providing third alternate content to the another mobile device to mask the third identity and providing fourth alternate content to the another mobile device associated with the fourth identity.

15. The non-transitory, machine-readable medium of claim 14, wherein a camera associated with the mobile device captures an image of a person facing the mobile device, wherein the mobile device determines the image of the person is not the user in response to performing facial recognition techniques on the image, wherein the mobile device masks the first content and presents the first alternate content and the second alternate content on a display of the mobile device.

16. The non-transitory, machine-readable medium of claim 14, wherein the first content comprises one of email content, text message content, social media content, mobile application content, notification content, cloud content, or a combination thereof.

17. A method, comprising:
identifying, by a processing system including a processing system, a user associated with a mobile device;
determining, by the processing system, a user type associated with the user;
identifying, by the processing system, a first identity associated with the user based on the user type and identifying, by the processing system, a second identity associated with the user based on the user type;
providing, by the processing system, first alternate content to the mobile device to mask the first identity and providing, by the processing system, second alternate content to the mobile device associated with the second identity; and
providing, by the processing system, an indication to the mobile device to mask first content received by the mobile device, wherein the mobile device masks the first content utilizing the first alternate content and the second alternate content in response to receiving the first content;
detecting, by the processing system, another mobile device associated with a civil entity;
identifying, by the processing system, another user associated with the another mobile device;
determining, by the processing system, another user type associated with the another user;
identifying a third identity associated with the another user based on the another user type and identifying, by the processing system, a fourth identity associated with the another user based on the another user type; and
providing, by the processing system, third alternate content to the another mobile device to mask the third identity and providing, by the processing system, fourth alternate content to the another mobile device associated with the fourth identity.

18. The method of claim 17, comprising providing, by the processing system, fifth alternate content to a first computing device associated with a call detail record repository, wherein the first computing device stores the fifth alternate content in the call detail record repository to mask the first identity and to disclose the second identity.

19. The method of claim 17, comprising providing, by the processing system, fifth alternate content to a second computing device associated with a bill record repository, wherein the second computing device stores the fifth alternate content in the billing record repository to mask the first identity and to disclose the second identity.

20. The method of claim 17, wherein the first content comprises one of email content, text message content, social media content, mobile application content, notification content, cloud content, or a combination thereof.

\* \* \* \* \*